Figure 1:
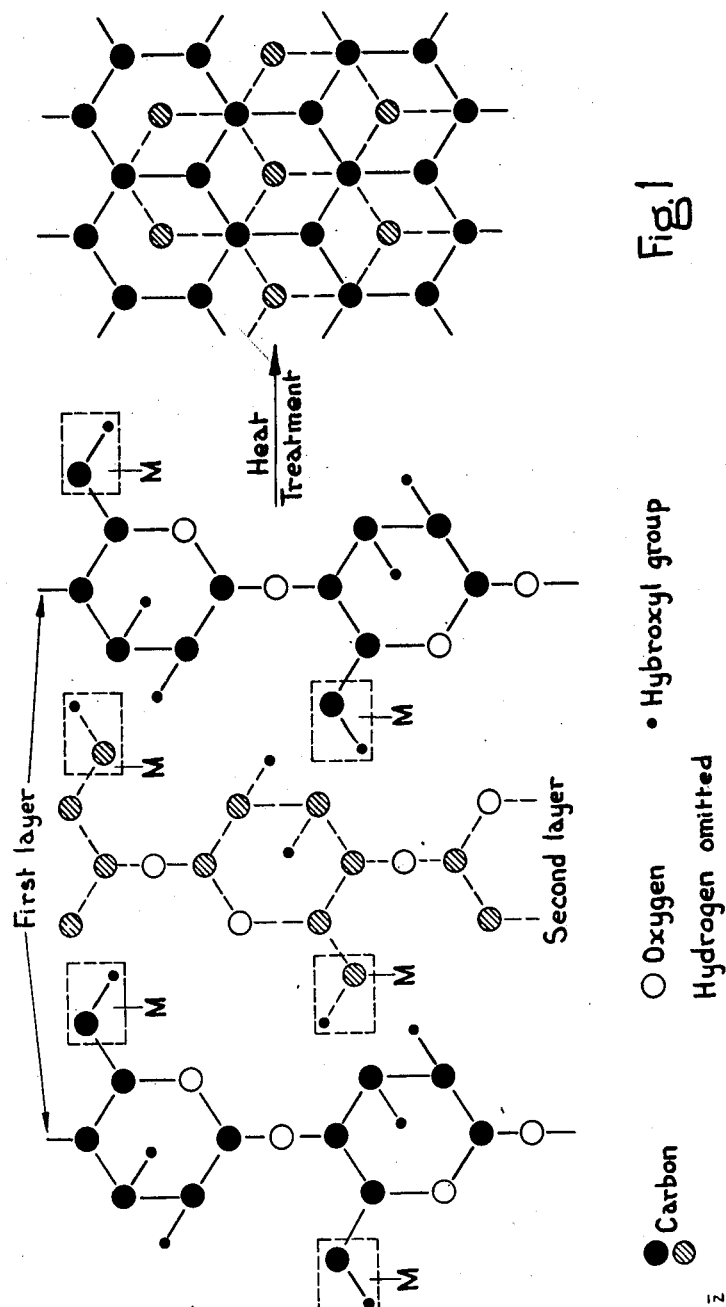

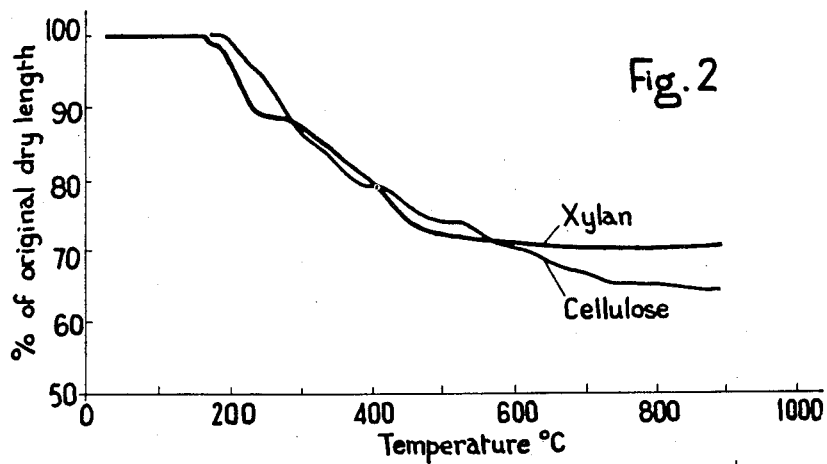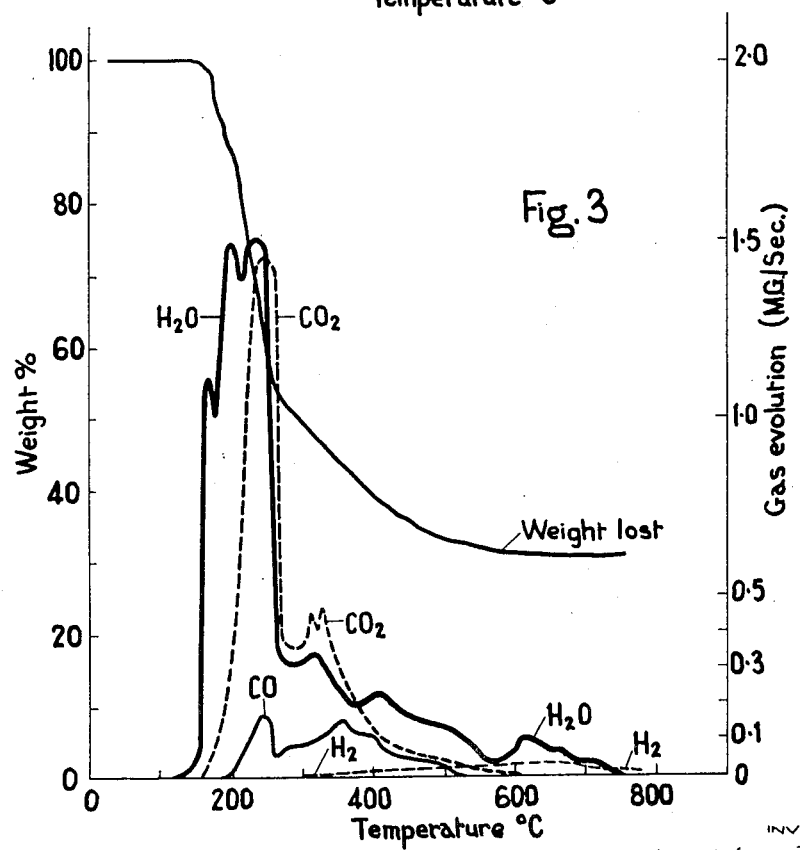

United States Patent Office 3,104,159
Patented Sept. 17, 1963

3,104,159
PRODUCTION OF GRAPHITE
Hugh Wilson Davidson, Pinner, England, assignor to The General Electric Company Limited, London, England
Filed Nov. 17, 1959, Ser. No. 853,479
Claims priority, application Great Britain Nov. 21, 1958
20 Claims. (Cl. 23—209.1)

This invention relates to the production of carbon and more particularly to the production of carbon which has substantially zero permeability and which is stable, at least in non-active atmospheres, up to so-called graphitising temperatures.

There is an increasing demand for really low permeability carbon products, especially in the nuclear engineering industry. Carbon which, under suitable conditions, is usuable at high temperatures, is also invaluable to the chemical industry as a corrosion-resistant material which is of light weight and which is resistant to thermal shock. Hereotfore, carbon materials which have been used in this sense have usually been of graphitic nature. Some have been prepared from natural graphite, for instance, which is composed of small plate-like crystals a few thousandths of an inch in thickness. Such individual natural crystals are not porous, but to obtain bulk of sufficient size to be of use for chemical or nuclear engineering processes it has been necessary to use a binder. Such binder however introduces porosity, and impregnants are necessary to seal the pores. Similarly, artificial graphite bodies which are usually prepared from petroleum coke particles bound together with coal tar pitch, and subsequently calcined and heat-treated at temperatures up to 3000° C., are extremely porous; the artificial graphite crystallites in bodies produced in this way, being about one-third the size of average natural crystals, are still quite large and they themselves are porous which does not help from the point of view of overall porosity. The use of these graphites has, therefore, had limitations, mainly associated with this porosity. Much work has been done in attempting to reduce the porosity, and mainly this has been on the lines of the development of impregnation techniques. While reasonable improvements have resulted from the use of such techniques, the presence of the impregnants has usually resulted in instability and in a limitation of the upper temperature at which the product can be used in service. It would obviously be preferable for impermeable graphite to be made directly, that is without the necessity for impregnation, and it is an object of the present invention to provide a direct method of producing impermeable carbon and/or carbon articles.

According to one aspect of the invention I have found that if cellulose in a fibrous condition is treated with a chemical dispersing agent, such as a solution of zinc chloride in water, to form a substantially colloidal dispersion in which the original fibres are broken down to an advanced stage of destruction, the dispersion being then washed with water to remove the chemical agent, the supernatant water being drawn off and the residue being substantially dried at around room temperature to regenerate the cellulose in a pure solid state, then heating the said pure regenerated cellulose will carbonise it in a micro-porous state. Then subsequently heating the carbon so formed to a temperature between 2500° C. and 3000° C. in an inert atmosphere I have found that a graphitic product results wherein this latter heating has caused the pores in the carbon to be blocked so that product is of low gas permeability.

According to another aspect of the invention I have found that a similar result is achieved if instead of treating the cellulose with a chemical dispersing agent, the dispersion is produced by mechanical breakdown of substantially all of its fibrous structure and if the cellulose in the pure solid state is regenerated from this dispersion. The purpose of forming this dispersion is to establish an intimate contact between the cellulose particles, which have been broken down from the original fibres, and water. The particles are readily accessible to water and this accessibility is further increased by the breaking up of the long chain molecules, glycosidic linkages between the molecules being hydrolysed by the acids released in the zinc chloride solution.

On the other hand, if the initial condition of the cellulose is such that the fibres are at least largely broken down, water itself may be a suitable medium. It is essential that, if water is to be used as the medium, the cellulose should first be mechanically treated, e.g. by beating or milling, preferably in the presence of water, until the fibrous structure of the cellulose is considerably reduced. Paper-making machinery of conventional type cannot handle pulp which has been subjected to excessive fibrillation and hydration, but for the present purpose the beating of the fibres must be continued beyond the normal pulping stage. The finely divided cellulose pulp thus obtained has a greatly increased surface area, so that the cellulose is in a condition particularly suited for establishing an intimate contact with water and analogous to the colloidal dispersion produced by a chemical medium such as zinc chloride.

In general, therefore, the dispersion may be produced by means which are either mainly chemical or mainly physical. Suitable chemical media require no initial processing of the cellulose, while reduction of the cellulose to a substantially non-fibrous condition is essential if water is to be used as the medium.

In the present context, "regenerating cellulose" is intended to mean recovery of the cellulose from the dispersion. Where chemical means of forming the dispersion are used, the regeneration will include washing of the dispersion to remove the chemical, possibly with coagulation of the dispersed cellulose, and then drying the cellulose after the supernatant water has been drawn off through a filter or a centrifugal machine. Where physical means are used, regeneration simply includes the steps of removing excess or supernatant water from the cellulose and drying it.

While the purpose of forming the dispersion is to bring the cellulose particles into intimate contact with water, the purpose of the regeneration is to remove an amount of water sufficent to allow the surfaces of adjacent particles of hydrated cellulose to be drawn together by strong forces of surface tension, until the surfaces are so close that secondary valences develop and complete the contact. The nature of these secondary valences is not completely understood, but it is thought that they may be hydrogen bonds, and they will be referred to henceforth quite generally as cross links.

The product in both cases is, therefore, a mass of small cellulose particles knit together by extensive cross links between the chains of the cellulose molecules. These cross links ensure pores of very small dimensions in the mass and also prevent its structural reorganization until exposed to very high temperatures. The cellulose mass is heated to form a strong homogeneous carbon specimen, decomposition products being allowed to escape through the porous structure without disrupting the material. The carbon thus formed is microporous in nature, the pore size being approximately 20 A. Graphitization of this carbon specimen is found to result in a substantially non-permeable carbon. It appeared that the low permeability was the result of the "graphitisation" treatment.

This is illustrated by measurements made on a graphite specimen at different stages in its preparation. Thus when the regenerated cellulose for the specimen had been carefully air-dried for some six days it was carbonised by a slow "gas baking" process so that its temperature was raised to about 1000° C. in four days, the bulk, or mercury, density of the carbon was 1.34 grams per cc. while the helium density was 1.95 grams per cc., the higher helium density indicating that the carbon was still permeable to this gas. Finally, the carbon specimen was graphitized. This again is a standard manufacturing process, the temperature being in less than an hour raised to a little over 2500° C. in an inert atmosphere such as argon, the specimen remaining at this temperature in a stream of argon for approximately a further 30 minutes. Little further shrinkage occurred at this stage, the mercury density increasing slightly to 1.37. The helium density, however, decreased to 1.4, a value very nearly equal to the bulk density of the graphite. This demonstrated that a substantially impermeable graphite specimen had been produced, and this was confirmed by direct transpiration tests.

It is a point of greatest concern to determine the reason for this unexpectedly great reduction of porosity in the final products and the conclusion has been reached that although it has much to do with the fact that the cellulose fibres lend themselves so readily to a high degree of dispersion while still retaining their extensive chain structure, this leading to the formation of a well-knit cellulose compact, there is probably another, possibly more important, factor.

Thus consideration of the basic unitary structure of cellulose and that of graphite, which are illustrated schematically in FIGURE 1 of the accompanying drawings, shows that the planar arangement of chains of glucosidic ring residues of the basic cellulose structure is predisposed to take up the basic graphite structure after condensation (in the chemical sense). The basic structure of graphite in its ideal form is lamellar, consisting of layer planes, spaced by a distance of 3.35 Angstrom units, of rings of hexagonally arranged carbon atoms held together by covalent bonds within the planes and by comparatively loose (Van de Waals) forces between the planes. The basic structure of cellulose, on the other hand, consists of layer planes of glucosidic linked ring residues, each comprising substantially hexagonally arranged atoms of which five are carbon and one oxygen. These linked residues are separated within the planes as indicated for the unit cell in FIGURE 1. The layers of planes are spaced by 3.95 Angstrom units, but the rings in adjacent planes are disposed relative to each other, not only in what is termed diagonal screw arrangement, but in planar displacement so that it is seen that in the condensed form, the array of planes of rings is usefully predisposed to take up the graphite array, as indicated in FIGURE 1.

As the condensation process progresses, the spacing between the layer planes is also reduced, the initial wider spacing appearing to be advantageous in that it should permit of easier passage of decomposition products which are evolved as a result of the condensation. The cellulose molecular structure also includes a side link in the form of an alcoholic hydroxyl group, $CH_2.OH$ (M in FIGURE 1) attached to each ring, which side link also of course includees a carbon atom. These molecular structures are held together in long aggregates of chains in natural cellulose and the cellulose can be broken down until practically all these aggregates are separately dispersed in a dispersing fluid. Then, when subsequently regenerated by removal of the supernatant fluid, these aggregates become knit together, and extensive cross links form a compact mass. The nature of these cross links is not fully understood—they are probably hydrogen bonds—but they do appear to provide the advantage of rigidity.

The application of heat causes onset of condensation and, although, in practice, precautions should be taken to control the rate of heating, the porous nature of the mass of cellulose is such that the gaseous and vaporous products of decomposition are permitted to escape readily, subject to the limitations described below, the cross links referred to appearing to maintain the porosity and also to delay complete assimilation of the carbon residues resulting from the decomposition of the individual chains into a continuum of layers of rings of carbon atoms similar to, but not necessarily stacked as in, the graphite structure as shown in FIGURE 1. At the same time the spacing of the layers of rings is reduced.

Ultimately after heating to approximately 1000° C. the volume of the mass shrinks by approximately a further third, the linear shrinkage being in accordance with the curve shown in FIGURE 2.

If the purity of the original cellulose is high, the remaining product is a pure carbon containing a network of pores of microscopic size. It is now assumed that this reduction to pure carbon is probably accompanied by the development of covalent bonds between the ring residues, an operation which should be simplified by the presence of the oxygen atom in each original residue as has been referred to in connection with FIGURE 1. If the rings were of the benzene type, that is comprising six carbon atoms, it would be necessary for two carbon atoms to be displaced from adjoining rings before bonding of this type could occur. In a chain structure of glucosidic ring residues, however, the presence of the oxygen atom as one of the atoms in each ring should not only simplify the displacement of carbon atoms from adjacent rings by the generation of a gaseous oxide of carbon, which is readily disposed of through the pores at this stage, but it is necessary only to secure the displacement of one carbon atom from each pair of adjacent rings to achieve the advantageous close-bonded graphitic type of carbon ring structure.

The states of extremely low permeability resulting from the graphitization treatment of this type of carbon body coupled with the inappreciable change of density was at first most unexpected. In this work, it had been foreseen that crystallographic changes should occur in the carbon, following the lines of FIGURE 1, but any changes of porosity had been expected to be accompanied by corresponding changes of the bulk density. Since cellulose does not pass through a liquid phase during the treatment, the only explanation for this new phenomenon must be that the pores become blocked by reason of crystalline growth from the walls of the pores, which growth eventually meets in individual pores to form effective barriers across the pores; all vapours and gaseous decomposition products having been allowed to escape before this final blockage of the pores.

This process has proved to be very attractive and has led, in particular to the production of material suitable for the canning of fuel elements for nuclear reactors. It will be appreciated that the high standards necessary for canning materials for reactor use are very exacting and materials provided by the present process, besides successfully meeting the requisite standards, permit higher temperatures of operation of these materials, thus providing yet another advantage.

In view of the high potential value of these materials, especially for nuclear reactors, these processes have been investigated further and from the improvements which have been resulted in these processes, stem further aspects of the invention.

Upon consideration of the basic materials used in conjunction with the work herein before described, it was conjectured that if the explanation of the carbonisation process were correct, then it should be important that obstructions of the micro-pores in the basic uncarbonised regenerated mass be kept to a minimum. As far as could be seen, although porosity would be controlled to a large extent by the degree of dispersion achieved for the cellulose, it was not possible to achieve complete dispersion since the stage was ultimately reached where there was insufficient "body" in the dispersion to enable regeneration to be properly carried out in the casting process. On the other hand it appeared to be an essential feature that, for an optimum reduction of the porosity of the regenerated mass, the dispersion should be carried to a very advanced stage. Experiments with cellulose, however, confirmed that if this were the case, difficulties sometimes arose in maintaining sufficient porosity for the successful evolution of decomposition gases and vapours. Thus, especially where the size of the product entails appreciable thickness of material, it was considered to be particularly important that the gases and vapours should meet with the minimum of obstruction in their passage through the material, and unless the condensation process were controlled to the extent of allowing only an extremely gradual increase of temperature, over a period of a week, it was found that a sound product did not always result; internal fissures were liable to occur and these detracted from the mechanical and physical properties of the final material. It was found that a period of perhaps as long as ten days was necessary in some cases for this initial carbonisation process. Although the porosity of the final product was lower than that of any known product it was considered desirable that the process should be improved to the extent of ensuring the production of a substantially flaw free impermeable carbon in as short a time and by as simple a means as possible.

One thing which was noted, on consideration of the cellulose structure, is that, being composed of the chains of glucosidic residues, the alcoholic hydroxyl group side link on each residue might in fact be operating not only to form additional decomposition products but also, in the initial stages, to form obstructions within the pores. In consequence the opinion was formed that it would be beneficial if the raw material comprised only chains of ring residues without side links, that is, without the side links M of FIGURE 1.

In order to test this theory attention was turned towards a xylan. Basically xylans are composed of chains of ring residues similar to those of cellulose but the residues are xylosic as opposed to the glucosidic residues of cellulose. Xylosic residue does not have the alcoholic hydroxyl group side link common to all glucosidic rings, its place on the ring being taken by a hydrogen atom, and therefore, on the face of it, it was eminently suitable for tests. Unfortunately, it did not appear to be possible to procure chain formations of xylosic ring residues with no side links whatsoever; but the material obtained from wheat straw has certainly many fewer side links than cellulose and these are of a different nature from those of the glucosidic residue, being also of ring residue structure.

Using a wheat straw product, which may in fact have contained a certain proportion of cellulosic material, although wheat straw has a very high xylosic content, a dispersion was prepared by mechanical beating in water to an advanced stage of dispersion.

This dispersion was found to respond more satisfactorily to the regeneration treatment than the pure cellulose dispersion discussed above. Thus using a slip casting technique, that is using a vertical centrifuge, it was found that compared with the cellulose dispersion, the new dispersion yielded a more uniform casting, and this appeared to be the result of less segregation in the centrifuge. Secondly, it was found that the tubular centrifuged product was far more easily dried than the corresponding cellulose product. As distinct from the rather careful manipulation and drying treatment of the cellulose product, spread over a period of as much as 10 days, it was found to be necessary only to pass hot air through the casting from the bowl of the centrifuge so as to dry one end of the tube sufficiently for the casting to be withdrawn from the centrifuge. Actually, for convenience, this part of the drying operation was conducted over-night, but it could probably have been effected much more rapidly. The upper end was then firm enough to be supported in an air-drying cabinet, operating at about 40° C., in which the casting was found to dry sufficiently for it to be removed for carbonisation after only about 48 hours. Examination showed it to be of very uniform structure at least under magnification up to about 150 times, and in this form it was readily machined. Geometric volume densities of up to 1.48 g./cc. have been obtained for this product at this stage.

Carbonisation of the machined tube resulted in the formation of a carbon tube having pore dimensions of only near molecular proportions, and which, after subjection to a graphitisation process at a temperature above 2100° C., has yielded a product which appears to be quite homogeneous, crack-free and capable of withstanding evacuation; it could in fact hold a good vacuum (say $10^{-5}$ mm./Hg) for a period of over 24 hours when isolated from the pumping system.

There are therefore distinct advantages in this new process over and above what have resulted from the process using cellulose material.

According to the present invention in its broadest aspect, the basic material for the production of substantially impermeable carbon comprises an homogeneous mass of chains of ring residues in which the arrangement of carbon atoms in unit cell is predisposed towards that in the basic layered structure of graphite, the mass being threaded with interconnected pores of microscopic and preferably near molecular, dimensions.

Now xylans, one of which formed the basis of experiments referred to above, are part of a group of substances known under the general title of hemicelluloses, which includes those amorphous polysaccharides forming part of the system which interpenetrates and incrusts the cellulosic fabric of natural cellulose, and also those short chain polysaccharides which form part of the cellulosic fabric itself.

A process for the production of carbon in accordance with another aspect of the present invention comprises the steps of forming a dispersion of hemicellulosic or predominantly hemicellulosic material in which the arrangement of carbon atoms in unit cell is predisposed towards that in the basic layered structure of graphite, regenerating the material, heating the regenerated material to form carbon and subjecting the carbon to a "graphitisation" process at a temperature higher than 2100° C.

It will be a matter of trial to select a suitable raw material depending upon the ultimate properties desired. Thus a benefit to be gained by the use of xylan in the particular example is illustrated in FIGURE 2, where the linear shrinkage of the sample is compared with that of a sample derived from cellulose. The product of the xylan material can also as shown above have extremely low permeability.

According to yet another aspect of the invention, a process for the production of carbon comprises the steps of selecting an organic substance of chain molecular structure with chains of six member ring residues and with preferably only a few, if any, side links to each chain of residues and such as in unit cell to be predisposed to take up the basic graphite structure after condensation, ensuring a high degree of dispersion of the chain structures in a fluid, said substance and said fluid being such that the fluid may be extracted within a short time to leave an aggregate of said structures with interconnected pores of very small proportions, said substance also being such that the said structures may be thermally decomposed, without passing through a liquid phase, to carbon, vapour(s) and gas(es) only, heating said aggregate to decompose the structures, the pores in the aggregate permitting egress of said vapour(s) and gas(es), thus preventing the formation of cracks and fissures in the carbonised product, and finally heating said carbon to at least 2100° C. in an inert, or non-oxidising, atmosphere or in vacuo to cause crystal growth into pores of said product substantially to block the said pores and to render the product substantially non-permeable.

Since it is desirable to have as little obstruction as possible to the egress of gases and vapours during the condensation process, it follows that it is preferable to avoid the presence of all but the minimum of material required for the production of the final required shape. A process according to the invention therefore is probably best applied to the production of a shaped article which is preformed, at least to a large extent, during the initial stages of the process. Such application, which is equally applicable in relation to cellulose, is described in greater detail below. Thus processes in accordance with the invention are particularly suited to the production of fuel element cans, pipework and other similar fittings for use with nuclear reactors. The fact that a product made in accordance with the invention will not normally be pore-free does not detract from the value of the invention. The formation of barriers across the pores imparts impermeability, and diffusion of fluids more particularly gaseous fluids, through the walls of the pores or through the barrier portions should not take place at all at normal temperatures and can be negligible even at the highest temperatures at present contemplated for permissible operation in nuclear reactors. Moreover it is found that a graphite body produced in accordance with the invention so as to have this extremely low permeability, also has strength which is superior to that of any other known graphite.

It is a feature of a process in accordance with the invention that pre-formation of a carbon product may be effected, not only by machining. Advantage may be taken of the somewhat pliable nature of the regenerated mass and it may be deformed, without adverse effect on final properties, to a form more suited to the shape of the finished product. Such deformation may be effected, for example, under pressure, possibly in a die, or it can be achieved by suitable disposition of support of the regenerated material during the drying stages.

According to yet another aspect of the present invention, at least an early part of the process of the condensation of the regenerated or aggregated material is arranged to be carried out under high pressure. The pressure is preferably the equivalent of tens of atmospheres and more specifically at least about 100 atmospheres. This stage of the condensation process can be carried out at temperatures up to 300° C. or more, the limited temperature being that of operation of the pressure vessel used. It will preferably be carried out in a non-reactive atmosphere such as nitrogen; but it will normally be permissible to operate in an atmosphere of carbon dioxide if preferred. It is also contemplated that hydrogen may be used. In any case it will not normally be necessary to arrange for absorption or extraction of the evolved gas(es) or vapour(s) in the course of this treatment.

Figure 4:
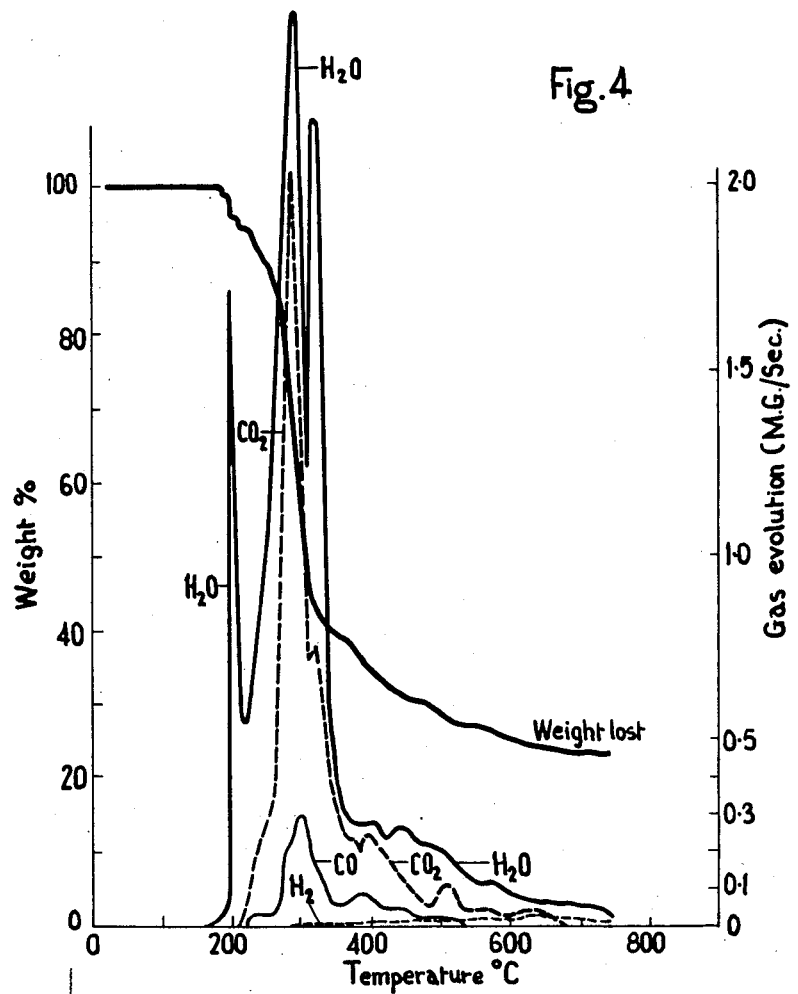

The condensation process of a xylan sample has been examined closely and FIGURE 3 shows the rates of evolution of some of the evolved vapours and gases at temperatures up to 750° C. The measurements were taken during a run under atmospheric pressure in which the temperature was raised at a uniform rate. It is seen that evolution of decomposition products is subject to considerable variation and for comparison similar curves for a cellulose product are shown in FIGURE 4. Extreme care is therefore necessary at the various temperatures, where the peaks in the curves appear, to avoid excessive evolution of the decomposition products to the extent of forming internal fissures in the bodies.

It appears however that in the pressurised treatment above described, the expulsion of the decomposition or condensation products from the body of the material under treatment is permitted with a lower pressure gradient within the material. The volume of gases, or vapours, expelled through the micro-porous structure of the material is proportional to both the pressure drop and to the mean pressure; a marked increase of mean pressure therefore permits the removal of the decomposition products at a reasonable rate with low pressure drop through the material, so rendering the material less liable to damage. It will of course still be necessary, even so, to arrange that the heat treatment is adjusted so that the temperature rise is such as to avoid excessive evolution; but overall the pressurised process will enable the treatment period to be considerably shortened.

It will of course be necessary also to ensure that the reduction of pressure after completion of this treatment is controlled to the extent of avoiding large pressure gradients through the material, since otherwise internal fissures may develop, perhaps even after the lapse of several hours.

In one example of manufacture of a body for a fuel element can in accordance with the invention, xylan, derived from a wheat straw by the Pomilio process (see Ind. Eng. Chem., vol. 31, 1939, p. 657) is subjected, at a consistency of 17.5 grams per litre of water, to a beating process in a standard laboratory beater of the Hollander type made by A-B Wennbergs Mecaniska Versted, Karlstad, Sweden (21 litre capacity). After 14 hours the resulting dispersion having a very fine milky consistency is fed into a large high speed vertical centrifuge (Sharples No. 6 open-type, superspeed centrifuge fitted with classifier type tubular bowl). The dispersion is fed into the bottom of the centrifuge and water is continuously removed from the top of the centrifuge, the beaten xylan being forced to the walls of the centrifuge which may be conveniently lined with a polytetrafluoroethylene tube. The xylan appears to regenerate very uniformly as a result of little segregation in the centrifuge. After all the batch of dispersion has been fed, it is found to be necessary only to pass hot air through the bowl of the centrifuge for a period of a few hours for the bottom of the tube so formed to be sufficiently dried, since the whole tube is then firm enough to be withdrawable by handling this end.

This tube, suspended by the dry end in a simple forced-air drying cabinet maintained at 40° C., is readily air-dried in about 48 hours. The linear shrinkage at this stage is approximately 75% of the wet length. In this form the tube appears, under magnification, to be of very uniform structure. The material in this state is readily machineable, and, if only for the reason as stated above that it removes surplus material which would otherwise become involved in the passage of decomposition gases and vapours, it may be desirable to machine suitably at this stage, making allowance for shrinkage, so as to yield the final product after final graphitisation. It moreover permits of an inspection of the material beneath the surface, so that a check can be kept on the quality of production of the material.

The next stage is to bake the tube at high pressure in an atmosphere of nitrogen. For this purpose the tube is loaded without any packing or special support into a pressure vessel which is sealed, purged of air and filled with nitrogen under a pressure of about 100 atmospheres. The vessel is then heated slowly to 360° C. over a period of 48 hours, the pressure rising in the course of this heating to about 200 atmospheres. While still at temperature, the pressure in the vessel is gradually reduced, at a rate of not more than 100 pounds per sq. in. every quarter of an hour; when normal atmospheric pressure is reached, the vessel is cooled down and the tube is unloaded. It is advantageous to release the pressure whilst still at temperature in the way described, since the effect of rate of release of pressure on the release of gas from pores within the structure is more sensitive at room temperature. The reason for pressurised heat treatment has been explained above, and the main reason in this particular case for not increasing the temperature beyond 360° C. at this stage is that, the pressure vessel, being of steel, might be overstrained at the high internal pressures. Even so it will be observed from FIGURE 3 (and indeed from FIGURE 4 for a cellulose material) that the major evolution of decomposition products has occurred below this temperature, so that this limiting temperature does not detract from the value of the process in a steel vessel. Presumably however, other materials could be used for such a vessel, if it were desired to conduct this part of the treatment at higher temperatures.

Experiments have shown that the strength of the tube gradually deteriorates in this part of the condensation process as its temperature is raised to 360° C. The pressure baking process therefore is advantageous at this stage.

After pressure baking, the tube is removed as a black shiny material representing about 40% by weight of the original machined dry xylan as indicated in FIGURE 3. In this respect the weight loss is not very different from that resulting from somewhat similar treatment of cellulose material (see FIGURE 4). It will be noted however that FIGURES 3 and 4 illustrate a further advantage of the use of xylan, in that the yield of final product, as carbon, is considerably greater than that from cellulose.

The tube is then placed in a baking furnace of the type normal to carbon making practice, the tube being packed in coke powder. The temperature of the furnace is raised to about 1000° C. over a period of 48 hours, whereupon a further contraction and a weight loss of about 14% of the original air-dried tube, occur.

The material is finally subjected to a "graphitization" process, that is, it is heated to a temperature at least 2100° C. in an argon atmosphere and yields a tubular product which could be submitted successfully to the type of vacuum test described above. The fuel can is completed by the provision of end caps which may be made in the following manner.

A two-to-one solution of zinc chloride in water is prepared as a chemical dispersion medium for cellulose. The solution is heated to its boiling point (135° C.), removed from the source of heat in order to avoid charring the cellulose during addition, and shredded good-quality blotting paper, cotton wool, or purified cotton rag pulp is added to give a 4 percent dispersion while the medium is being vigorously stirred. The highly viscous dispersion so obtained is added, while still hot and also with vigorous stirring, to about eight to ten times its volume of water. Sufficient hydrochloric acid is now added to the water to prevent precipitation of zinc hydroxide, and under these conditions the cellulose slowly settles in regenerated form. After about twelve successive decantations and a final washing with pure water, the precipitate of regenerated cellulose is pebble milled for fifteen minutes and strained to break down or remove large cellulose particles which may have coagulated to an undesirable extent in the acidified water. The cellulose mass is then placed in a filter press to remove the supernatant water, and regeneration is completed by careful drying at room temperature or just above. The mass shrinks by about 50 percent and a tough horn-like translucent mass remains from which a shape as required may be machined ready for carbonization.

Figure 5:
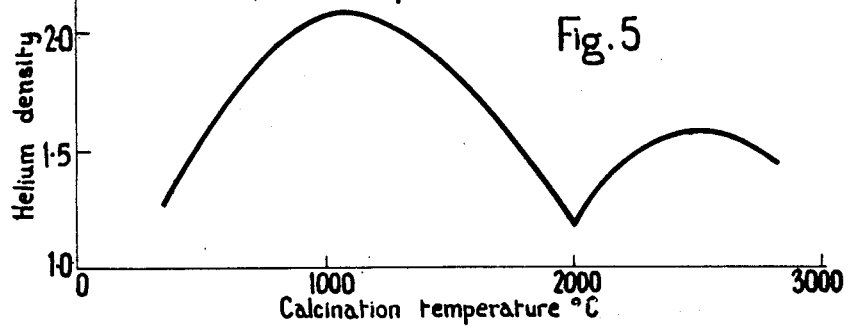

Helium density tests on materials produced in the manner described have indicated densities equivalent to geometric volumes and thus have demonstrated the impermeable nature of the materials in another way. A series of helium density tests have been conducted at different stages of the production and the variation of density is indicated in FIGURE 5. The initial rise of density is obviously due to the shrinkage of the structure combined with the continued decomposition process. The fall between 1000° C. and 2000° C. may be attributed to the closure of pores, and the rise above 2000° C. possibly to the consolidation of the layers of planes of rings in the carbon structure towards the graphite spacing. The fall above 2500° C. would appear to be caused by a volumetric expansion of the specimen due to expansion of gas trapped in the closed pores. There is a possibility also that this latter effect may mask greater changes than indicated between 2000° C. and 2500° C.

When treating graphitisable carbon specimens at temperatures in the range of graphitising temperatures, graphitisation is known to involve a gradual reduction of layer-spacing towards 3.35 A. As the spacing is reduced to a critical value, then imperfections in the crystal lattice which are produced by neutron irradiation, begin to have large effects on mechanical properties. The critical value appears to be about 3.39 A. and, for nuclear engineering applications, care may have to be taken that graphitisation treatments are controlled for this reason. With the exception of the more graphitic products mentioned below, in products made according to the present invention however, the minimum mean layer-spacing noted, even after graphitisation treatments up to 3000° C., may be only 3.40–3.42 A., so that they are not subject to this disadvantage. Moreover it has been found that the helium density (and therefore the closed pore character) of the products does not change, even after prolonged exposure to irradiation in a nuclear reactor. They are therefore particularly adaptable for nuclear applications.

Crystallographic examinations of the materials have indicated that, in any case, the final product is not highly graphitised in the sense that there is no formation of large crystallites. Thus crystallites present have seldom been observed to be greater than a few hundred A. in size, whereas the average size of natural graphite crystallites is 10,000 A. or more. Moreover, the crystals will normally be almost entirely turbostratic in structure. However it can be shown that the crystallinity, i.e. size and ordering, that is perfection, of the crystallites in an artificial product made in accordance with the invention can be controlled, to an extent, by suitable pre-treatment of the raw material. Thus it was found that if the dispersion had been subjected to a prolonged grinding in a pebble mill, the resulting product, after subsequent processing, showed more or less extensive crystal growth. This is a catalytic phenomenon and is believed to be due to the presence of siliceous impurities introduced into the dispersion by the pebbles. It is apparent that different crystal size can be achieved by the addition of controlled quantities of silica. The degree of ordering in the layer planes of the crystallites has been found by this means to be as good as, if not better than, that of normal commercial graphites, which is an advantage for some purposes.

According to a still further aspect of the invention in a process for the production of substantially impermeable carbon, which includes making a dispersion of chain structures of ring residues in which carbon atoms are disposed in unit cell substantially in an approximation to that of an ideal graphite structure, the said dispersion being subsequently regenerated into an homogeneous mass for conversion to carbon by condensation methods, crystallinity of the final crystallites in said impermeable carbon is arranged to be controlled by arranging for the presence of suitable impurities in said dispersion. Although not the most satisfactory method, silica as the impurity may be introduced as a result of prolonged pebble milling or the like in which case the impurity is well distributed in the dispersion and in the subsequently produced carbon body. It will volatilise during the graphitisation treatment.

If graphitisability is of primary importance, it may be necessary to avoid excessive grinding of the dispersion since there is some evidence that this will reduce the graphitisability. It appears however that the effect is less than can be achieved in the sense of increasing graphitisability by the catalytic action above referred to.

It is evident that this latter treatment could lead to the establishment of a process yielding impermeable products having a reasonably wide range of crystallite development, thereby permitting of an adjustment of machinability. Other properties which will be affected by control of crystallinity are, of course, thermal conductivity, electrical conductivity, and lubricating effect, and it is probably through control of this latter effect that the aforementioned adjustment of machinability is achieved.

Experiments have been made on the basis of the addition of fillers to dispersions of chain structures above described and it has been found that it is still possible to achieve the production of substantially impermeable articles with the addition of fillers, such as carbon blacks or colloidal graphite. The effect of such fillers appears to depend to a large extent, as might be expected, upon the particle size of the filler. Thus, petroleum coke, which is used for the production of artificial graphites does not appear to be capable of reduction to the fineness required to yield impermeable products when used as a filler. Even in the cases of carbon blacks and colloidal graphite it is apparent that an addition of 15 percent (based on dried weight of regenerated material) to the dispersion is about the maximum which may be permitted.

The addition of fillers, so long as they do not impair the high temperature properties of products in accordance with the various aspects of the invention, should have advantages. Thus, if the additives are already graphitic in nature, they should serve to reduce the shrinkages at the different stages of the processes and, by reducing the quantity of material requiring to be decomposed, to bring about a reduction of the volume of decomposition products which have to pass out of the body being processed; this should also reduce the time for completion of the different stages of the processes, and may cause an increase of strength of the regenerated mass. There is, in addition, the practical aspect of increased lubricating power in the final product, and therefore of increased machinability, if the additions are themselves graphitic.

I claim:

1. A process for the production of carbon comprising the steps of forming a dispersion of fibrous carbohydrate material consisting of chains of basic six-atom hexagonal rings, of which one atom is oxygen and the remainder carbon atoms relatively orientated as in the pyranose ring, said rings being linked in chains by oxygen atoms, regenerating the material in a pure state, heating the pure regenerated material to form carbon and subjecting the carbon to a "graphitization" process at a temperature higher than 2100° C.

2. A process for the production of carbon comprising the steps of selecting a fibrous polysaccharide material dispersing the chain structures of said polysaccharide material to a high degree in a fluid, said polysaccharide material and said fluid being such that the fluid may be extracted to leave an aggregate of said structures with interconnected pores of very small proportions, said polysaccharide also being such that the said structures may be thermally decomposed, without passing through a liquid phase, to carbon, vapour and gas only, extracting substantially all said fluid from said dispersion to form said aggregate, heating said aggregate to decompose the structures, the pores in the aggregate permitting egress of said vapour and gas, thus preventing the formation of cracks and fissures in the carbonised product, and finally heating said carbon to at least 2100° C. in a non-reacting atmosphere to cause crystal growth into pores of said product substantially to block the said pores and to render the product substantially non-permeable.

3. A method of producing a shaped carbon article which comprises making use of the process as claimed in claim 2 and in the initial stages of that process arranging to preform said article at least to an appreciable extent, whereby not only is the bulk of regenerated material required to be heated to form carbon reduced but, in addition, substantially the least obstruction is offered to egress of the vapour and gas of decomposition of said material.

4. The method as claimed in claim 3, wherein said preforming operation comprises arranging for the regeneration of said material to be performed about a suitable former.

5. The method as claimed in claim 4, wherein further preforming is effected by machining the regenerated preform.

6. The method as claimed in claim 4, wherein further preforming is effected by mechanical deformation before the completion of the drying stage.

7. The method as claimed in claim 4, wherein further preforming is effected under gravitational force by suitable disposition of support of the regenerated material during the drying stage.

8. A method of producing a shaped carbon article using the process as claimed in claim 1, wherein at least an early part of the said heating is arranged to be carried out under high pressure.

9. The method as claimed in claim 8, wherein said pressure is at least about 100 atmospheres.

10. A process for the production of substantially impermeable carbon which includes making a dispersion of fibrous carbohydrate material consisting of chains of basic six-atom hexagonal rings, of which one atom is oxygen and the remainder carbon atoms relatively orientated as in the pyranose ring, so that the carbon atoms are disposed, in unit cell, approximately as in an ideal graphite unit cell, regenerating said dispersion to form an homogeneous mass, converting the mass to graphite by heating to carbonization and crystallization temperatures successively, said process including the step of introducing a silica impurity into the dispersion so as to control the crystallinity of the final crystallites in said impermeable carbon.

11. A process as claimed in claim 10, wherein said silica impurity is introduced as a result of prolonged working by means of pebbles.

12. A process for the production of carbon as claimed in claim 1 wherein the said fibrous carbohydrate material is a xylan.

13. A process for the production of carbon as claimed in claim 2 wherein the said polysaccharide material is predominantly xylosic.

14. The process which comprises the steps of forming a dispersion of cellulose in a liquid, regenerating the cellulose in a pure solid state, heating the pure regenerated cellulose to carbonize it in a microporous state, and then heating the carbon so formed to a temperature between 2500° C. and 3000° C. in an inert atmosphere to form a graphitic product and block the pores in the carbon so that said product will be of low gas permeability.

15. The process which comprises treating cellulose in a fibrous condition with a chemical dispersing agent to form a substantially colloidal dispersion in which the original fibres are broken down to an advanced stage of destruction, washing this dispersion with water to remove the chemical agent, drawing off the supernatant water and substantially drying at around room temperature to regenerate the cellulose in a pure solid state, heating the pure regenerated cellulose to carbonize it in a microporous state, and then heating the carbon so formed to a temperature between 2500° C. and 3000° C. in an inert atmosphere to form a graphitic product and block the pores in the carbon so that said product will be of low gas permeability.

16. The process claimed in claim 15 wherein the chemical dispersing agent is a solution of zinc chloride in water.

17. The process which comprises the steps of first producing, by mechanical breakdown of substantially all its fibrous structure, a dispersion of cellulose in water, regenerating the cellulose in a pure solid state, heating the pure regenerated cellulose to carbonize it in a microporous state, and then heating the carbon so formed to a temperature between 2500° C. and 3000° C. in an inert atmosphere to form a graphitic product and block the pores in the carbon so that said product will be of low gas permeability.

18. The process which comprises the treatment of a cellulosic fibrous structure to produce a dispersion of the cellulose in water such that the greater part of said structure has been reduced until it is no longer visible to the naked eye, removing supernatant water from said dispersion, substantially drying the cellulose at around room temperature to regenerate the cellulose in a pure solid state, heating the pure regenerated cellulose to form carbon in a miscroporous state, and then heating the carbon so formed to a temperature between 2500° C. and 3000° C. in an inert atmosphere to form a graphitic product and block the pores in the carbon so that said product will be of low gas permeability.

19. The process which comprises regenerating cellulose in massive form in a pure solid state from a dispersion of the cellulose, substantially drying the mass, machining said mass to a predetermined shape, heating said shape to carbonize the pure regenerated cellulose in a microporous state, and then heating it to a temperature between 2500° C. and 3000° C. in an inert atmosphere to form a graphitic body of desired shape and block the pores in the carbon so that said body will be of low gas permeability graphite.

20. The process which comprises centrifuging a dispersion of cellulose to regenerate the cellulose in a pure solid state in the form of a tube, substantially drying said tube at around room temperature, machining the tube to predetermined dimensions, heating the machined tube to carbonize the regenerated cellulose in a microporous state, and then heating the carbon tube so formed to a temperature between 2500° C. and 3000° C. in an inert atmosphere to form a tube of graphite and block the pores in the carbon so that said tube will be of low gas permeability.

References Cited in the file of this patent

UNITED STATES PATENTS

| | | |
|---|---|---|
| 1,037,901 | Hansen | Sept. 10, 1912 |
| 1,357,290 | Kemmer | Nov. 21, 1920 |
| 1,482,939 | McIntosh | Feb. 5, 1924 |
| 1,827,931 | Blankenstein | Oct. 20, 1931 |

FOREIGN PATENTS

| | | |
|---|---|---|
| 725,053 | Great Britain | Mar. 2, 1955 |